(No Model.)
M. E. CHARTIER.
MACHINE FOR MAKING PILLS.
No. 362,357. Patented May 3, 1887.
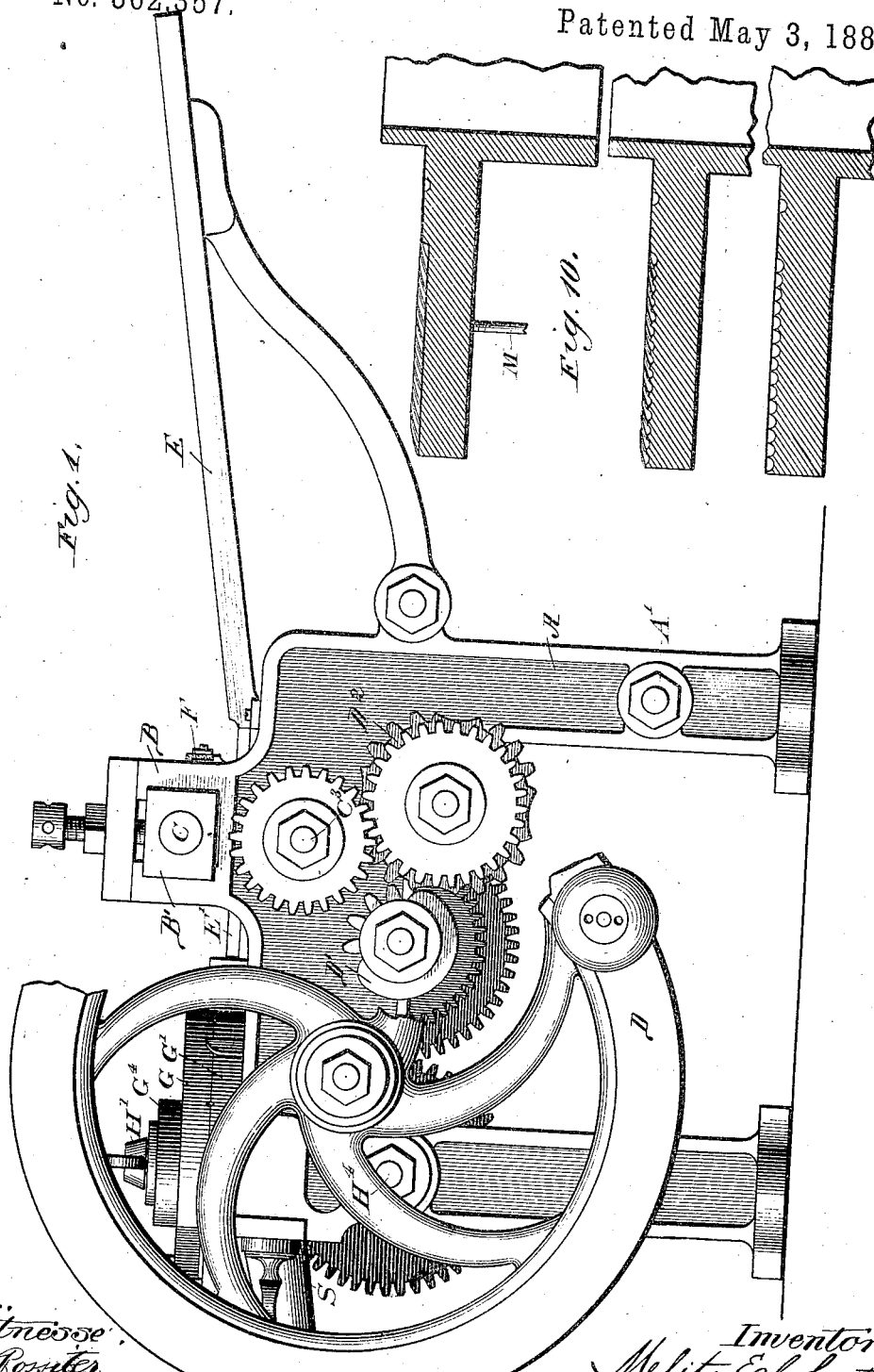

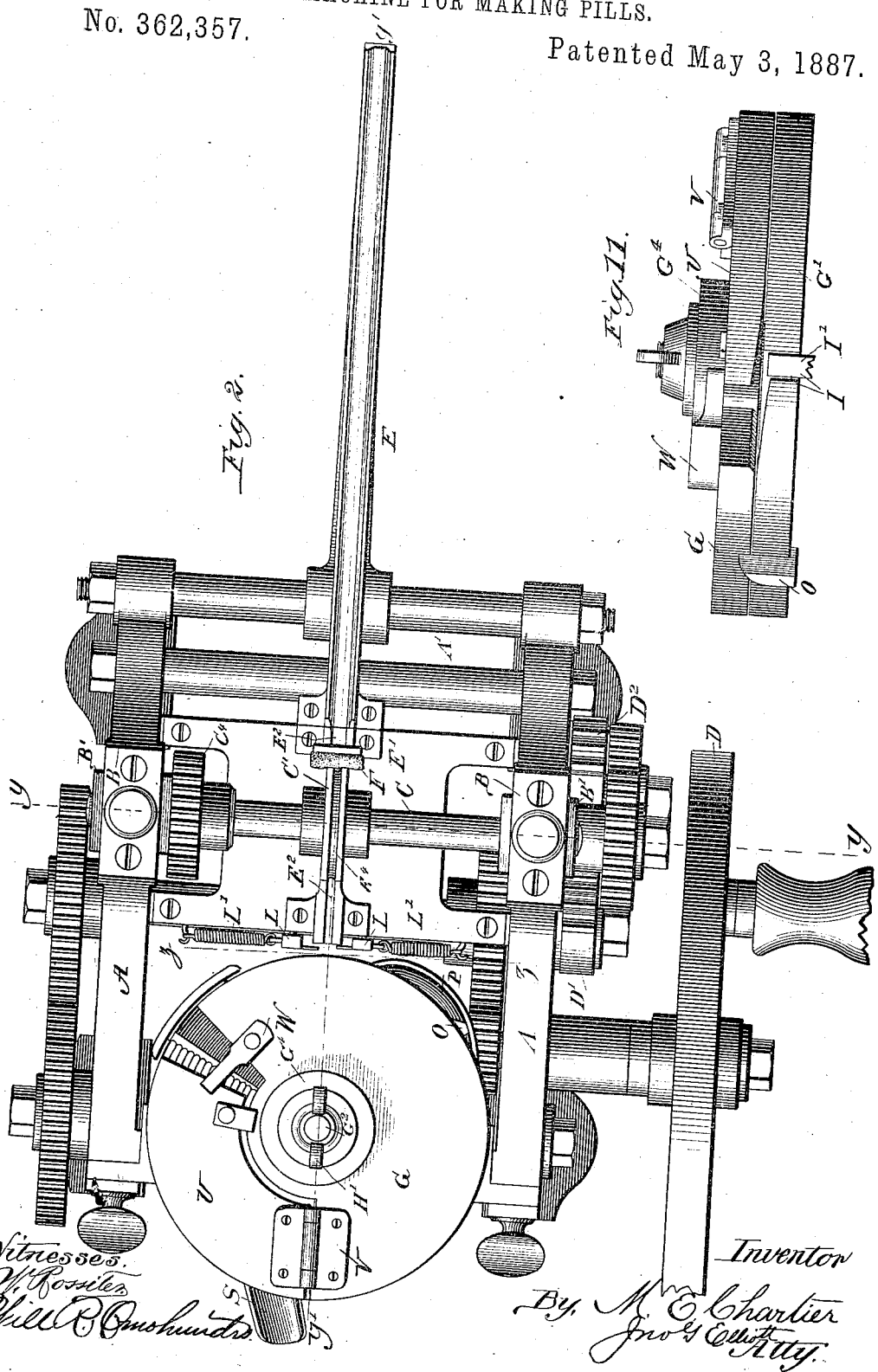

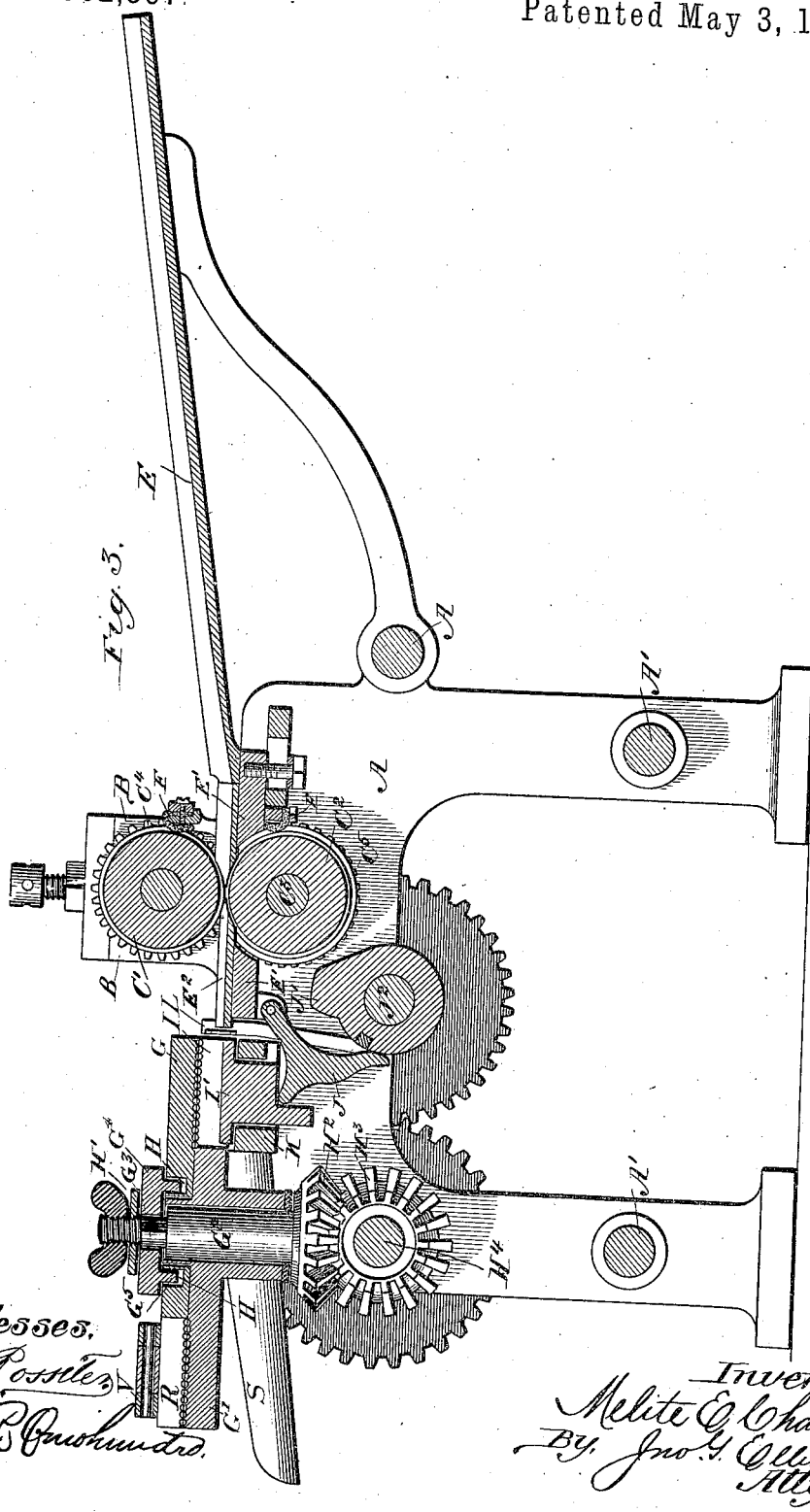

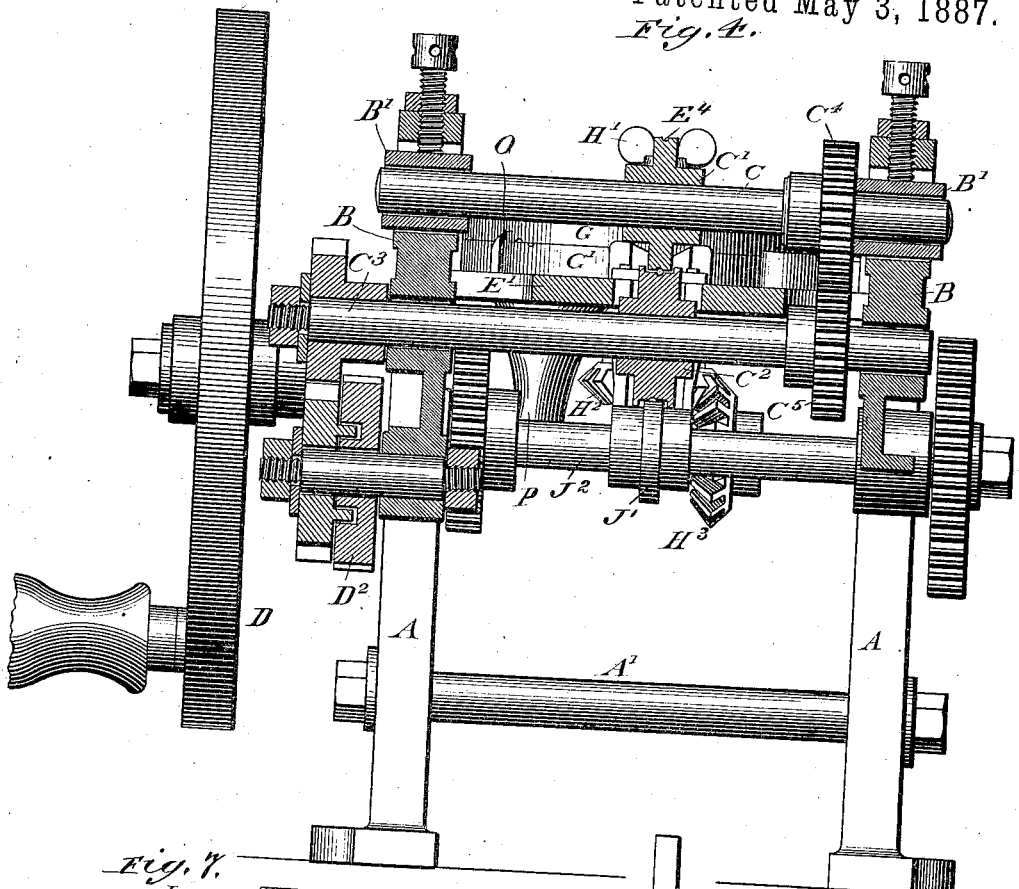
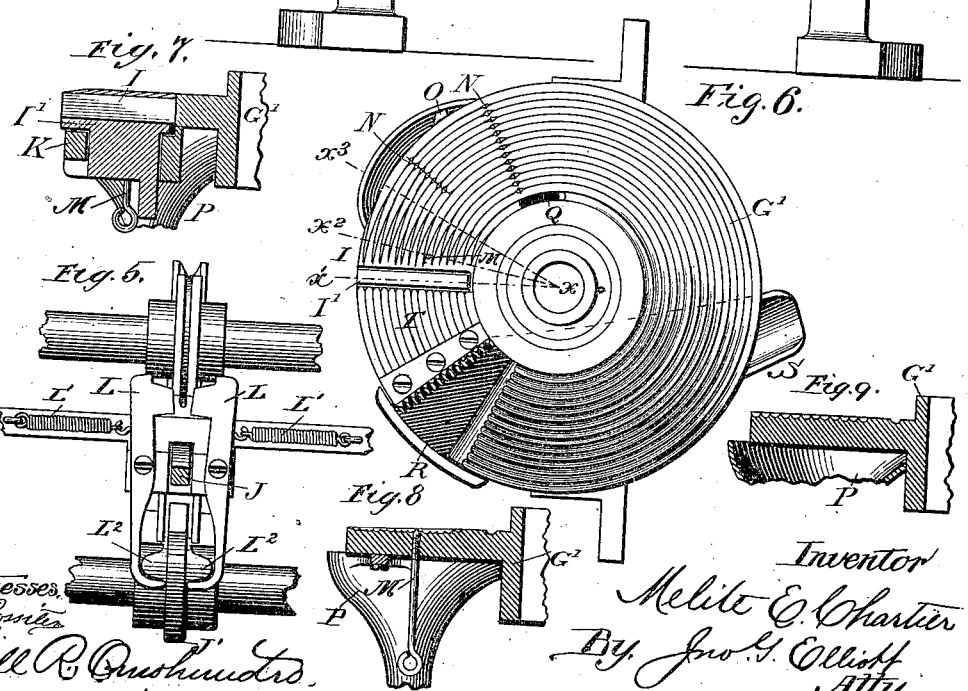

UNITED STATES PATENT OFFICE.

MÉLITE E. CHARTIER, OF CHICAGO, ILLINOIS, ASSIGNOR TO JOHN E. HARPER, OF SAME PLACE.

MACHINE FOR MAKING PILLS.

SPECIFICATION forming part of Letters Patent No. 362,357, dated May 3, 1887.

Application filed September 16, 1886. Serial No. 213,662. (No model.)

*To all whom it may concern:*

Be it known that I, MÉLITE E. CHARTIER, a citizen of the United States, residing at Chicago, county of Cook, and State of Illinois, have invented certain new and useful Improvements in Machines for Making Pills and Granules, of which the following is a specification.

This invention relates to improvements in pill-making machines, in which the pills are formed by being cut in suitable sizes from a mass in a plastic condition and of irregular shapes, and afterward formed into pills of a uniform and predetermined size by being rolled between two plates, either one or both of which travel.

The prime object of this invention is to provide a pill-machine in which the mass in a suitable form shall be automatically fed to the pill-forming plates, cut off in lengths sufficient to fill the forming plates or molds, rolled into the form of pills, and discharged from between the forming-plates during the continuous operation of the machine.

Another object is to provide such a machine with circular forming plates or molds, which shall automatically divide the mass fed thereto into the desired number of sections and roll the same into the form of pills.

Other objects are to provide means for introducing the mass between the forming-plates at regular intervals during the continuous operation thereof; to provide cutters automatically operated to separate the mass into lengths just sufficient to fill the molds of the forming-plate, and to provide certain other details of construction, hereinafter more fully described, and illustrated in the accompanying drawings, in which—

Figure 1 represents a side elevation of the device embodying my invention; Fig. 2, a top plan view thereof; Fig. 3, a central vertical section on line $x$ $x$, Fig. 2; Fig. 4, a transverse vertical section on line $y$ $y$, Fig. 2, looking toward the rear end of the machine; Fig. 5, a detail transverse section on line $z$ $z$, Fig. 2; Fig. 6, a detail plan view of the bottom forming-plate; Fig. 7, a detail section thereof on line $x$ $x'$, Fig. 6; Fig. 8, a similar view on line $x$ $x^2$ of same figure; Fig. 9, another similar view on line $x$ $x^3$ of same figure; Fig. 10, enlarged detail views showing the formation and inclination of the walls of the mold of the lower forming-plate at the beginning of said mold; Fig. 11, a detail side elevation of the forming-plates.

Similar letters of reference indicate the same parts in the several figures of the drawings.

Referring by letter to the accompanying drawings, A A indicate the castings or side frames for supporting the operating mechanisms of my machine, and rigidly connected together by means of the tie-rods A'. Toward the forward ends of these castings, and projecting upwardly therefrom, are the extensions B B, constituting bearings for the adjustable journal-boxes B' of a cross-shaft, C, extending transversely across the machine, and having mounted thereon, about the center of length thereof, the upper one, C', of a pair of rotary feed-wheels, the lower one, $C^2$, of which is carried on a corresponding shaft, $C^3$, loosely journaled in the side frames, A, at a suitable distance immediately below the shaft C. These shafts C and $C^3$ are suitably geared together, so as to work in unison, by means of the cog-wheels $C^4$ and $C^5$, the actuating-power being preferably applied to the shaft $C^3$ through the medium of a train of gearing driven by a master-wheel mounted upon the shaft of the crank-wheel D, to which the power is directly applied, which latter, however, may be substituted by a belt-wheel or any other suitable gearing, and the machine be moved by power instead of by hand.

The train of gearing connecting the master-wheel must of course be so timed and speeded as to cause the feed-wheels to operate in unison with the other operating parts of the machine, and as their feed must be intermittent I have provided the mutilated gears D' $D^2$ in the said train, so timed as to rest the feed-rolls at the required intervals, the said wheels only feeding at a time sufficient of the mass from which the pills are made to fill the molds of the forming-plates, which must make a complete revolution before they can receive and operate upon the next portion of the mass fed thereto. This mass is formed either by hand, or by a separate and special piece of machinery made for that purpose, into sticks of a suitable length—say from twelve to eighteen inches, generally—which are fed to the machine down an inclined way, E, rigidly secured to the front part of the machine, and onto a table, E', arranged on either side of the feed-rolls, and having a groove, E², formed therein for conducting the stick accurately to the feed-rollers. These rollers have formed in the peripheries thereof grooves semicircular in cross-section, which, meeting on a line drawn vertically through the axes thereof, through which the mass is drawn and forced, and which, by reason of its plastic condition, no matter what its form before being fed to the wheel, will, after passing the feed-wheels, have the form of a cylinder, in which form it is fed to the pill-forming plates or molds.

The feed-rolls are each provided with cleaners F F, consisting of felting, brushes, or other suitable devices, which are designed to keep the faces of said wheels free from the adherence of any particles of the mass thereto.

The pill-forming plates consist of two circular disks, located one above the other, the upper one, G, being rotatable, and the lower one, G', fixed and secured to a stationary portion of the main frame, just to the rear and in a plane slightly above the table E', back of the feed-wheels.

The upper plate, G, is actuated by means of a short vertical shaft, G², passing loosely and axially through the lower plate, G', and having a squared portion, G³, projecting above the top of the plate G, upon which is fitted a washer, G⁴, having a corresponding squared perforation for the reception of the shaft, and depending pins or studs G⁵, engaging recesses or sockets H, formed in the upper surface of the plate G, through the medium of which the rotary movement of the shaft G² is imparted to the said upper plate, the said shaft being held in position by a suitable nut and washer, H', screwed to the end thereof. The said shaft G² is actuated through the medium of the bevel-gear H², keyed to the lower end thereof, and a corresponding bevel-gear, H³, mounted on a cross-shaft, H⁴, journaled in the side frames, and in turn actuated by a suitable train of gear, connecting it with the master cog-wheel, so as to properly time the rotation of the upper plate with relation to the other operative portions of the machine.

The opposing surfaces of the pill-forming plates—that is to say, the upper surface of the bottom plate and the under surface of the top plate—have formed therein a series of annular concentric grooves semicircular in cross-section, which, when placed in position opposing each other, form circular passages or ways of a diameter equal to that of the desired size of pill, the diameter of which, taken in connection with the total diameter of the plates, regulates the number of grooves which can be formed, and consequently the number of pills which can be made at a single operation, the said grooves beginning at the peripheries of the plates and extending in concentric circles toward the center thereof, the inner and outer peripheries of the grooves abutting against one another, the approach toward the center being limited only by the diameter of the actuating-shaft of the upper plate.

In order to permit the introduction of the mass between the forming-plates, a slot, I, is formed in the lower or stationary plate, extending radially therein from the periphery thereof a distance substantially corresponding to the number of grooves in said plate. Working vertically through this slot is a vertically-moving filling-plate, I', snugly fitting into said recess, and caused to rise vertically through said slot by means of a dog, J, pivoted to the under side of the table E', which said dog is swung upon its pivot by a cam, J', rigidly mounted on a cross-shaft, J², extending transversely across the machine and loosely journaled in the side frame, A, to which power is applied by a suitable train of gearing connecting said shaft with the master cog-wheel, and so timed as to operate intermittently and at the proper time with relation to the rotation of the upper forming-plate, upon which the successful operation of the machine in a great measure depends. The said filling-plate I' works through a suitable guide, K, which also prevents the said plate from falling out of position.

As will be seen from Fig. 3, when the plate I' is in its lowest position and nearly at the bottom of the slot in the forming-plate the top surface thereof is in a plane with the bottom of the groove E², formed in the table E', and it is while in this position that the feed-wheels operate to deliver the mass to the forming-plates, the slot I of the lower one of which registers with the said groove E², into which the mass is forced, and after being fed therein the full length of the slot the feed stops and the mass is severed at the mouth of the slot, between the end of the table and the bottom forming-plate.

The mechanism employed for severing the mass will be better understood by reference to Fig. 5, in which is shown a pair of cutting-knives, L L, opposing each other on each side of the groove E² and pivoted about the center of length thereof to the end of the table E', which knives are held apart by the springs L', secured at one end thereto and at their opposite ends to the said table. To overcome the tension of these springs and cause the said knives to approach each other and sever the mass, I employ the cams L², mounted upon the shaft J² at each side of the cam J', by means of which the lower free ends of the cutting-knives are forcibly moved away from each other, producing a consequent approach toward each other of the opposite cutting ends of said knives just at the moment the feed stops and just prior to the elevation of the severed mass into the path of the forming-plate.

After the mass has been severed the plate I' rises, carrying with it the severed portion of just sufficient length to extend transversely across all of the grooves or molds of the forming-plates, and consequently transversely to the movement of the upper forming-plate, the action of which serves to roll the mass off the plate T and in between the forming-plates, the grooves of which it fills.

The upper and lower forming-plates have their working-surfaces, and consequently the walls of the grooves, beveled off a suitable distance, the latter beyond the slot in the direction of rotation and the former one back of a corrresponding slot therein, as clearly illustrated in Fig. 11, so that when these two parts come together in starting the mass in between the forming-plates the said mass may be caused to roll along upon the bottom plate and become fully engaged between the two plates before entering the grooves and being severed into individual pills. In connection with this beveled and almost plain surface, I employ a detent, M, which is vital to the entire operation of the machine, for by it the inner end of the piece of mass is detained, while the outer end travels forward on the arc of a circle, so that the entire piece between the forming plates is presented to the grooves extending in a radial line from the center, and consequently at right angles thereto, in which position the mass must be held until the mass is separated into pills, which, being in the grooves, must necessarily follow the arc of their circle. This detent may be simply a piece of wire or small screw working through a screw-threaded hole in the lower forming-plate, just beyond the slot I therein, in the direction of rotation of the upper plate, the upper pointed end of which projects just sufficiently above the surface of said plate to engage the stick of mass, and of course with relation to the grooves at some point between the inner and middle grooves.

To insure the total separation of the mass into pills, I form a line of transverse notches, N, extending radially across the grooves in the forming-plates, whereby the thin shred connecting the pills will be broken at these points.

The excess of material over and above what is enough to fill all the molds is removed from the outside or peripheries of the forming-plates by means of a stationary knife, O, secured to the lower forming-plate just beyond the slot therein, the cut-off mass falling into a pocket, P, also secured to the lower forming-plate, from whence it is conducted by means of a pipe or trough into a suitable receptacle. The innermost groove is utilized for this purpose, having a slot, Q, formed therein, extending through the lower plate and connecting with the same receptacle as the pocket P. From the slot I in the lower plate the grooves extend continuously almost entirely around said plate; but just before reaching said slot they are abruptly interrupted by another slot or opening, R, extending radially and transversely across their path, through which the completely-formed pills are discharged into a trough, S, and from thence delivered into a suitable receptacle provided for that purpose.

That portion of the lower plate, T, extending between the slots I and R has no function whatever, so far as its grooved surface is concerned, and might just as well be plain, for the slot R is of sufficient width to effectually prevent inertia from carrying the pills across said slot. The upper rotating forming-plate, G, has also a slot therein corresponding to the slot R, and a portion of this plate G, extending back of said slot, is separated from the main body of the plate so far as a rigid connection is concerned, but connected by a hinge, V, so that this portion of the plate may be thrown upon the said hinge and the lower plate exposed for cleaning or other purposes. It is held in its normal position by a button, W, secured to the main body of the plate.

Having described my invention, what I claim, and desire to secure by Letters Patent, is—

1. In a pill-machine, the combination, with the forming-plates, of means for automatically and intermittently feeding the mass to said plates, severing said mass into suitable lengths, and introducing said mass between the forming-plates during a continuous rotation of one of said plates, substantially as and for the purpose described.

2. In a pill-machine, a lower stationary forming-plate and an upper rotating forming-plate, said plates having annular concentric registering grooves in their opposing faces, in combination with means for automatically and intermittently feeding the mass to said plates, severing said mass into suitable lengths, and introducing said mass between the forming-plates during a continuous rotation of said upper plate, substantially as described.

3. In a pill-machine, a revolving shaft, in combination with forming-plates one of which is mounted on said shaft, said plates having concentric registering grooves in their opposing faces, and one or both of said plates being provided with a recess or opening, whereby mass may be introduced between said plates during a continuous rotation of one of them, substantially as described.

4. In a pill-machine, a revolving shaft, in combination with forming-plates one of which is mounted on said shaft, said plates having annular concentric registering grooves in their opposing faces, and one or both of said plates being provided with a radial recess or opening extending inwardly from the periphery thereof, and thereby interrupting the continuity of said grooves, whereby mass may be introduced between said plates during a continuous rotation of one of them while in contact with the other, substantially as described.

5. The lower fixed forming-plate the upper rotating forming-plate, the said plates having concentric grooves in their opposing faces, and the said lower plate being provided with a radial slot extending inwardly from the periphery, in combination with a vertically-adjustable filling-plate working through said slot, substantially as described.

6. The lower fixed forming-plate, the upper rotating forming-plate, the said plates having concentric grooves in their opposing faces, and the said lower plate being provided with a radial slot extending inwardly from the periphery, in combination with a vertically-adjustable filling-plate working through said slot $a'$, pivoted dog engaging said filling-plate, and a cam for actuating said dog, substantially as described.

7. The lower fixed forming-plate and the upper rotating forming-plate having concentric registering grooves in their opposing faces, the said lower plate being provided with a radial slot extending inwardly from the periphery, in combination with a vertically-adjustable filling-plate, and means for automatically and intermittently actuating said plate, substantially as described.

8. The lower fixed forming-plate having concentric grooves in the upper face thereof and a radial slot extending inwardly from the periphery thereof, said plate being also provided with a discharge-opening beyond said slot and extending radially and transversely across said grooves, in combination with a vertically-adjustable filling-plate working through said slot, and the upper rotary forming-plate having grooves corresponding with those of the lower forming-plate, substantially as described.

9. The lower fixed forming-plate and the upper rotating forming-plate, said plates being provided with a series of concentric grooves in the opposing faces thereof, registering with each other, in combination with a pin or projection on the upper face of the lower plate beyond the receiving point and between the inner and middle grooves, substantially as described.

10. The lower fixed forming-plate having concentric grooves in the upper face thereof and provided with a radial slot extending inwardly from the periphery, the said upper face thereof being beveled toward said slot on one side thereof, in combination with a vertically-adjustable filling-plate working through said slot, a pin or projection on said lower plate, near said slot, between the inner and middle grooves, and the upper rotating forming-plate having grooves corresponding to the grooves in said lower plate, substantially as described.

11. The lower forming-plate having concentric grooves in the upper face thereof and provided with a radial slot extending inwardly from the periphery thereof, said upper face being beveled upwardly and forwardly from said slot, in combination with a vertically-moving filling-plate working through said slot, and the upper rotating forming-plate having grooves in the under face thereof opposing the grooves in said lower plate, and provided with a radial slot extending inwardly from its periphery, said under face being beveled rearwardly from said slot, substantially as and for the purpose described.

12. The lower fixed forming-plate and the upper rotary forming-plate, said plates having concentric grooves in the opposing faces thereof, and the lower plate being provided with a radial slot extending inwardly from the periphery, in combination with the vertically-adjustable filling-plate working through said slot, and an intermittently-operating feed device for filling said slot when the filling plate is at its lowest adjustment, substantially as described.

13. The lower fixed forming-plate and the upper rotary forming-plate, said plates having concentric grooves in the opposing faces thereof, and the lower plate being provided with a radial slot extending inwardly from the periphery, in combination with the vertically-adjustable filling-plate working through said slot, a pair of feed-wheels in alignment with said slot, and a grooved guideway leading from said wheels to the slot, substantially as described.

14. The upper and lower forming-plates, the feed-wheels, and a guideway leading from said wheels to the plates, in combination with a cutter intermediate said guideway and the plates, substantially as described.

15. The forming-plates, the feed-wheels, and a guideway leading from said wheels to the plates, in combination with the pivoted opposing cutting-knives intermediate said guideway and plates, and cams for automatically operating said cutting-knives, substantially as described.

MÉLITE E. CHARTIER.

Witnesses:
WILL R. OMOHUNDRO,
W. W. ELLIOTT.